(12) United States Patent
Wada

(10) Patent No.: US 12,154,350 B2
(45) Date of Patent: Nov. 26, 2024

(54) POSITION DETERMINATION DEVICE

(71) Applicant: HONDA MOTOR CO., LTD., Tokyo (JP)

(72) Inventor: Koichiro Wada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 328 days.

(21) Appl. No.: 17/562,565

(22) Filed: Dec. 27, 2021

(65) Prior Publication Data

US 2022/0215674 A1 Jul. 7, 2022

(30) Foreign Application Priority Data

Jan. 4, 2021 (JP) .................. 2021-000231

(51) Int. Cl.
*G06T 7/73* (2017.01)
*G06V 20/56* (2022.01)

(52) U.S. Cl.
CPC .............. *G06V 20/588* (2022.01); *G06T 7/74* (2017.01); *G06T 2207/30256* (2013.01)

(58) Field of Classification Search
None
See application file for complete search history.

(56) References Cited

U.S. PATENT DOCUMENTS

| | | | |
|---|---|---|---|
| 7,286,933 B2 * | 10/2007 | Cho ..................... | G01C 21/165 701/472 |
| 8,510,044 B2 * | 8/2013 | Watanabe .............. | G01S 19/47 701/472 |
| 9,651,394 B2 * | 5/2017 | Park ................... | G01C 21/3623 |
| 10,569,774 B2 | 2/2020 | Oyama | |
| 11,639,853 B2 * | 5/2023 | Minamiguchi . | B60W 30/18163 701/445 |
| 2005/0049787 A1 | 3/2005 | Cho | |

(Continued)

FOREIGN PATENT DOCUMENTS

JP H09-152342 A 6/1997
JP 3112405 B2 * 11/2000

(Continued)

OTHER PUBLICATIONS

Office Action dated Aug. 29, 2022, issued in counterpart JP Application No. 2021-000231, with partial English translation. (4 pages).

(Continued)

*Primary Examiner* — Ian L Lemieux
(74) *Attorney, Agent, or Firm* — WHDA, LLP

(57) ABSTRACT

A position determination device comprises a camera to capture an image ahead of a vehicle. The position determination device acquires position of the vehicle; estimates a first position of the vehicle, based on a position of a lane included in the image, the position of the vehicle that has been acquired, and map information; estimates a second position of the vehicle, based on a position of the vehicle that was determined most recently and a movement amount of the vehicle; and synthesizes the first position and the second position to determine the position of the vehicle, wherein the device weights the second position while the vehicle is traveling at a speed equal to or lower than a predetermined speed, and synthesizes the first position and the second position.

8 Claims, 6 Drawing Sheets

(56) References Cited

U.S. PATENT DOCUMENTS

| | | | | |
|---|---|---|---|---|
| 2008/0071476 A1* | 3/2008 | Hoshizaki | ............ | G01C 21/165 |
| | | | | 701/472 |
| 2008/0294342 A1* | 11/2008 | Hoshizaki | ............... | G01S 19/47 |
| | | | | 701/472 |
| 2013/0131976 A1* | 5/2013 | Hubbard | ................ | G01C 21/30 |
| | | | | 701/412 |
| 2016/0377437 A1* | 12/2016 | Brannstrom | ......... | G05D 1/0274 |
| | | | | 701/501 |
| 2018/0281789 A1 | 10/2018 | Oyama | | |
| 2019/0155293 A1* | 5/2019 | Oniwa | .................. | B60W 30/10 |
| 2020/0109948 A1 | 4/2020 | Toda et al. | | |
| 2021/0107537 A1* | 4/2021 | Ross | .................... | B61L 25/026 |
| 2021/0323606 A1* | 10/2021 | Namba | ................ | B62D 15/025 |
| 2022/0204046 A1* | 6/2022 | Hosoya | ............ | B60W 60/0055 |

FOREIGN PATENT DOCUMENTS

| | | | |
|---|---|---|---|
| JP | 2001-325245 A | 11/2001 | |
| JP | 2007-183432 A | 7/2007 | |
| JP | 2018-173303 A | 11/2018 | |
| JP | 2020-56701 A | 4/2020 | |
| KR | 2019040818 A * | 4/2019 | ............. G01C 21/12 |
| WO | 2017/130397 A1 | 8/2017 | |

OTHER PUBLICATIONS

Office Action dated Sep. 1, 2024, issued in counterpart to CN Application No. 202111596809.1, with English translation. (14 pages).

* cited by examiner

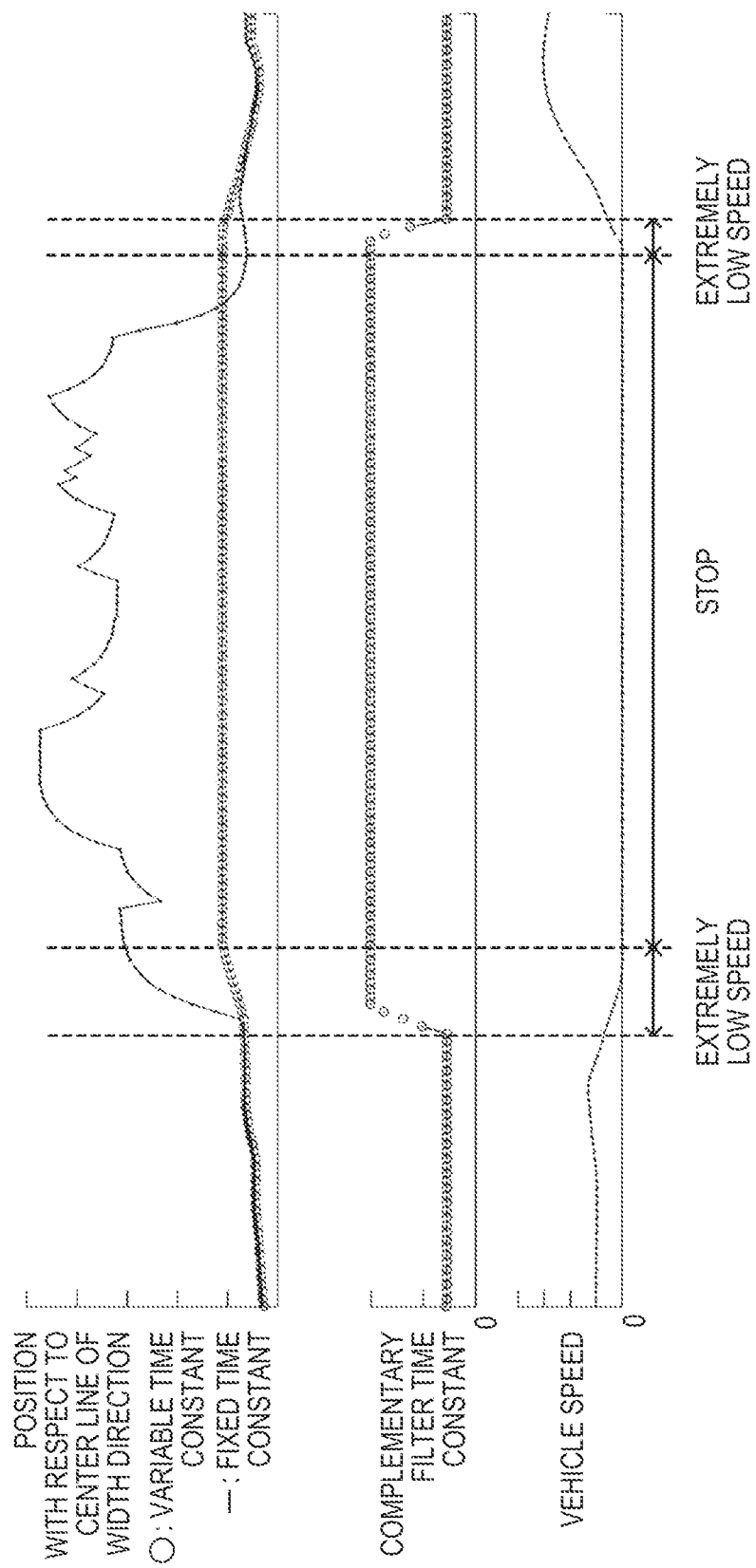

POSITION DETERMINATION DEVICE

CROSS-REFERENCE TO RELATED APPLICATION(S)

This application claims priority to and the benefit of Japanese Patent Application No. 2021-000231 filed on Jan. 4, 2021, the entire disclosure of which is incorporated herein by reference.

BACKGROUND OF THE INVENTION

Field of the Invention

The present invention relates to a position determination device for a vehicle or the like that conducts, for example, automated driving.

Description of the Related Art

In the automated driving of the vehicle, a sensor monitors a specific direction or all directions of the vehicle, and monitors a driver's state or a traveling state of the vehicle to control the automated driving of the vehicle in an appropriate route or at an appropriate speed in accordance with the monitoring results. In such automated driving, some control devices for the vehicles for controlling the automated driving (alternatively, also referred to as an automated driving system) are capable of recognizing, for example, a division line on a road from an image and recognizing a finer position of the vehicle on the road, together with position information using a navigation satellite.

In addition to the position that has been recognized in this manner, there is also a technique of integrating a moving direction and a movement amount from a reference position to estimate the position. Then, there has been proposed a technique of integrating the positions that have been acquired by these different methods and using the result as the position (Japanese Patent Laid-Open No. 2020-56701).

In the technique of recognizing the division line to estimate the position, however, the position in the width direction of the road that has been recognized may be deviated because of the recognition result of the division line on the road. For example, on a downhill slope or the like, a display for prompting deceleration is given in some cases by drawing broken lines on both sides of the lane. In such cases, once the broken line for the deceleration display is recognized as the division line, the position that has been recognized in the width direction of the road deviates from the original position by a space between the division line and the deceleration display. The positional deviation in the width direction of the road leads to the determination that the vehicle has traveled on the division line or has entered an adjacent lane depending on, for example, the deviation amount. Then, this determination may cause an originally unnecessary operation or control, for example, an intervention by the automated driving, for example, an intervention in steering, a transition in an automated driving level (for example, a decrease), or the like. Such a positional deviation in the width direction is likely to occur, for example, in a situation where the position in the width direction is determined by relying only on the division line on one side of the lane, and such a situation is likely to occur particularly in a low-speed range.

SUMMARY OF THE INVENTION

The present invention has been made in view of the above circumstances, and has an object to provide a position determination device capable of determining a position with high accuracy even in a low-speed range.

In order to achieve the above object, the present invention has the following configuration.

That is, according to one aspect of the present invention, there is provided a position determination device comprising:

a camera configured to capture an image ahead of a vehicle;

at least one memory;

at least one processor, at least one program stored in the at least one memory, when executed, causing the at least one processor to function as:

a position information acquisition unit configured to acquire position information of the vehicle;

a first position estimation unit configured to estimate a first position of the vehicle, based on a position of a lane included in the image, the position information of the vehicle that has been acquired, and map information;

a second position estimation unit configured to estimate a second position of the vehicle, based on a position of the vehicle that was determined most recently and a movement amount of the vehicle; and a position determination unit configured to synthesize the first position and the second position to determine the position of the vehicle, wherein the position determination unit weights the second position while the vehicle is traveling at a speed equal to or lower than a predetermined speed, and synthesizes the first position and the second position.

According to the present invention, the position can be determined with high accuracy even in a low-speed range.

BRIEF DESCRIPTION OF THE DRAWINGS

FIG. 6 is a diagram illustrating an example of temporal transition of a position obtained by applying the present invention.

DESCRIPTION OF THE EMBODIMENTS

Figure 1:
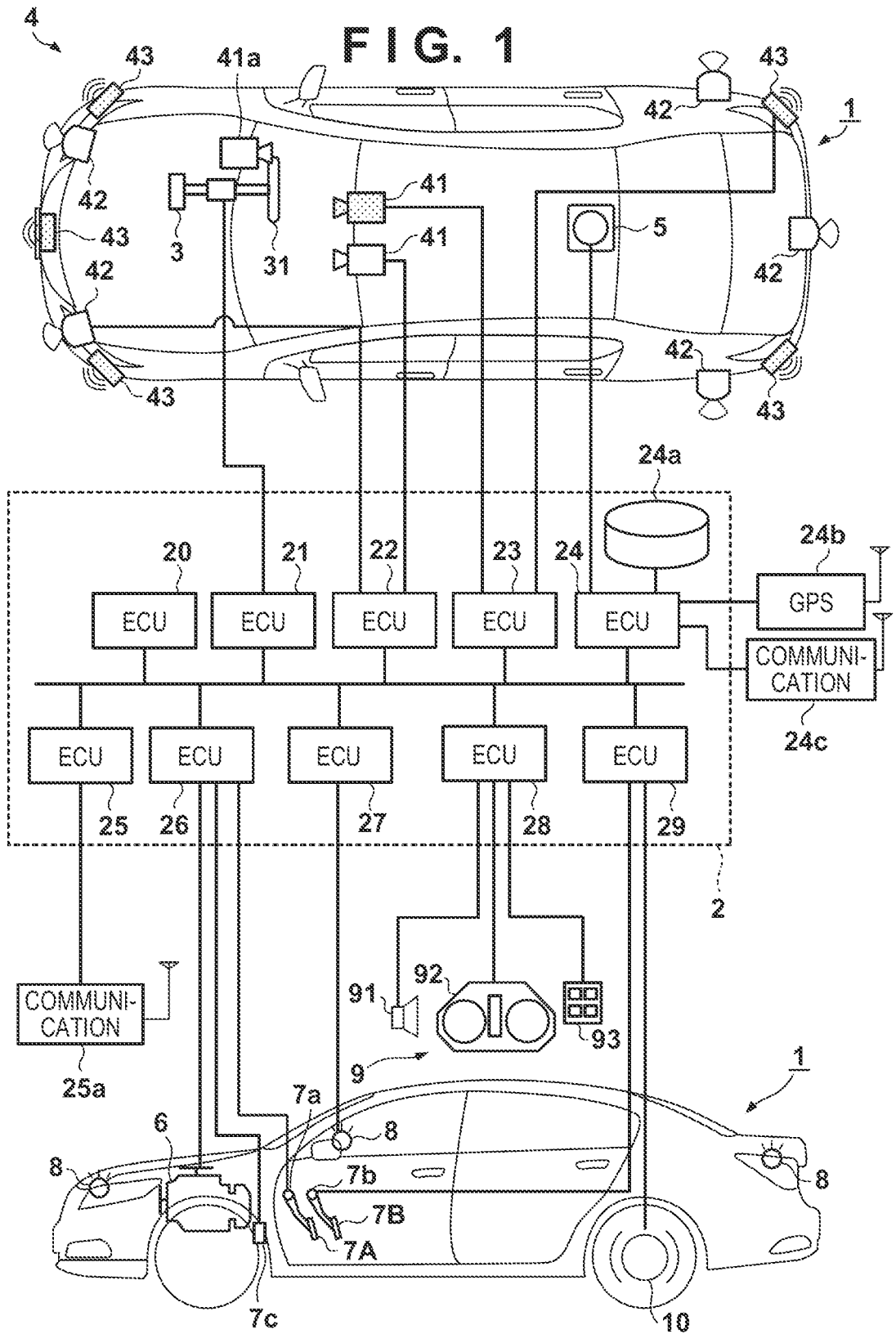
FIG. 1 is a diagram illustrating a configuration of a vehicle system of an automated driving vehicle according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Overview of Automated Driving

First, an overview of an example of automated driving will be described. In the automated driving, in general, a driver sets a destination from a navigation system equipped on a vehicle before traveling, and determines a route to the destination with a server or the navigation system. When the vehicle starts, a vehicle control device (or a driving control device) including an ECU or the like provided in the vehicle drives the vehicle to the destination along the route. Meanwhile, the vehicle control device determines an appropriate action in a timely manner in accordance with an external environment such as a route or a road condition, a driver's condition, or the like, and conducts, for example, driving control, steering control, braking control, and the like for such an action to cause the vehicle to travel. These types of control may be collectively referred to as traveling control.

In the automated driving, there are several control states (also referred to as levels of the automated driving control state or simply states) depending on an automated rate (or an amount of tasks requested to a driver). In general, as the level of the automated driving control state is higher, that is, as the automated level is higher, the task (that is, the load) requested to the driver reduces. For example, in an uppermost control state (which is a second control state, and is also referred to as level 3) in the present example, the driver may pay attention to something other than driving. This is conducted in a less complicated environment, for example, in a case of following a preceding vehicle in a traffic jam on an expressway. However, in the present embodiment, such a control state is applied to cruise traveling on an expressway with few obstacles. In addition, in a first control state that is lower (also referred to as level 2), the driver does not have to grip the steering wheel, but has to pay attention to the surrounding situations and the like. This first control state may also be applied to a case of the cruise traveling on an expressway or the like. Note that the driver's attention to the surroundings can be detected by a driver state detection camera 41a (see FIG. 1), and the gripping of the steering wheel can be detected by a steering wheel grip sensor of an electrostatic capacitance type (not illustrated). The driver state detection camera 41a may recognize, for example, the driver's pupil to determine the direction in which the driver looks, but may simply recognize the driver's face to estimate the direction to which the driver's face is oriented as the direction in which the driver looks.

In a further lower control state (referred to as level 1 or the like, in some cases), the driver does not have to perform a steering wheel operation or a throttle operation, but has to grip the steering wheel and pay attention to traveling environments in preparation for handing over the driving control from the vehicle to the driver (also referred to as a takeover or taking over driving). A further lower level control state (also referred to as level 0 or the like, in some cases) is manual driving, but includes automated driving assistance. The level of such automated driving is switched in accordance with the state of the vehicle and the external situation that have been detected by the vehicle. For example, in a case where it is determined that the vehicle is driving on a lane division line, based on the position of the vehicle (also referred to as a self-position) that has been determined by the vehicle, the level of the automated driving is lowered from level 3 to level 2 or is lowered from level 2 to level 1, in some cases.

Configuration of Vehicle Control Device

FIG. 1 is a block diagram of a vehicle control device in accordance with an embodiment of the present invention, and the vehicle control device controls a vehicle 1. In FIG. 1, the vehicle 1 is schematically illustrated in a plan view and in a side view. The vehicle 1 is, for example, a four-wheeled passenger vehicle of a sedan type.

The control device of FIG. 1 includes a control unit 2. The control unit 2 includes a plurality of ECUs 20 to 29, which are communicably connected with one another through an in-vehicle network. Each ECU includes a processor represented by the CPU, a storage device such as a semiconductor memory or the like, an interface with an external device, and the like. In the storage device, programs executed by the processor, data used for processing by the processor, and the like are stored. Each ECU may include a plurality of processors, storage devices, interfaces, and the like.

Hereinafter, functions and the like assigned to each of the ECUs 20 to 29 will be described. Note that the number of ECUs and the functions assigned to the ECUs can be designed as appropriate for the vehicle 1, and can be subdivided or integrated when compared with the present embodiment.

The ECU 20 conducts control related to automated driving of the vehicle 1. In the automated driving, at least one of the steering and the acceleration or deceleration of the vehicle 1 is automatically controlled. In a control example to be described later, both the steering and the acceleration or deceleration are automatically controlled.

The ECU 21 is a steering ECU that controls a steering device 3. The steering device 3 includes a mechanism that steers front wheels in accordance with a driver's driving operation (steering operation) on a steering wheel 31. In addition, the steering device 3 is an electric power steering device, and includes a motor that assists a steering operation or exerts driving force for automatically steering the front wheels, a steering angle sensor that detects a steering angle, and the like. When the driving state of the vehicle 1 is the automated driving, the ECU 21 automatically controls the steering device 3 in response to an instruction from the ECU 20, and controls the traveling direction of the vehicle 1.

The ECUs 22 and 23 control detection units 41 to 43 that detect the surrounding situation of the vehicle, and perform an information process on a detection result. The surrounding situation is also referred to as a surrounding state, an external environment, or the like, and information obtained by detecting them is referred to as surrounding situation information, surrounding state information, external environment information, or the like. The detection units for those surrounding states and the ECUs that control the detection units are also collectively referred to as a peripheral monitoring device or a peripheral monitoring unit. The detection unit 41 is a camera that captures an image ahead of the vehicle 1 (hereinafter, referred to as a camera 41, in some cases), and two detection units are provided in the inside of the vehicle 1 in the present embodiment. By analyzing the image that has been captured by the camera 41, it is possible to extract a contour of a target object or extract a division line (white line or the like) of a lane on a road. The detection unit 41a is a camera for detecting the state of the driver (hereinafter, referred to as the driver state detection camera 41a in some cases), is installed to be capable of capturing a driver's facial expressions, and is connected with an ECU that processes image data, although not illustrated. In addition, as a sensor for detecting a driver state, there is a steering wheel grip sensor, not illustrated. Accordingly, it is possible to detect whether the driver is gripping the steering wheel. The driver state detection camera 41a and the steering wheel grip sensor are also referred to as a driver state detection unit.

The detection unit 42 is a light detection and ranging or laser imaging detection and ranging (LiDAR) (referred to as a LiDAR 42, in some cases), detects a target object in the surroundings of the vehicle 1, and measures a distance to the target object. In the present embodiment, five LiDARs 42 are provided, including one at each corner portion of a front part of the vehicle 1, one at the center of a rear part of the vehicle 1, and one at each lateral side of the rear part of the vehicle 1. The detection unit 43 is a millimeter-wave radar (hereinafter, referred to as a radar 43, in some cases), detects a target object in the surroundings of the vehicle 1, and measures a distance to the target object. In the present embodiment, five radars 43 are provided, including one at the center of the front part of the vehicle 1, one at each corner portion of the front part of the vehicle 1, and one at each corner portion of the rear part of the vehicle 1.

The ECU 22 controls one camera 41 and each LiDAR 42, and performs an information process on a detection result. The ECU 23 controls the other camera 41 and each radar 43, and performs an information process on a detection result. The provision of two sets of devices for detecting the surrounding situation of the vehicle enables an enhancement in the reliability of the detection result. In addition, the provision of different types of detection units such as a camera, a LiDAR, and a radar enables analyses of the surrounding environment of the vehicle (also referred to as a surrounding state) in a multilateral manner.

The ECU 24 controls a gyro sensor 5, a global positioning system (GPS) sensor 24b, and a communication device 24c, and performs an information process on a detection result or a communication result. The gyro sensor 5 detects a rotational motion of the vehicle 1. The course of the vehicle 1 can be determined using the detection result of the gyro sensor 5, the wheel speed, and the like. The GPS sensor 24b detects the current position of the vehicle 1. That is, the GPS sensor 24b functions as a vehicle position information acquisition unit. The communication device 24c conducts wireless communication with a server that provides map information and traffic information, and acquires these pieces of information. The ECU 24 is capable of accessing a map information database 24a constructed in the storage device, and the ECU 24 conducts a route search and the like from the current position to a destination. The ECU 24 may achieve a self-vehicle position recognition unit 140 (also simply referred to as a position recognition unit 140) illustrated in FIG. 2.

The ECU 25 includes a communication device 25a for vehicle-to-vehicle communication. The communication device 25a conducts wireless communication with other surrounding vehicles to exchange information between the vehicles.

The ECU 26 controls a power plant 6. The power plant 6 is a mechanism that outputs driving force for rotating driving wheels of the vehicle 1, and includes, for example, an engine and a transmission. The power plant 6 is referred to as a travel driving force output device 6, in some cases. For example, the ECU 26 controls an output from the engine to correspond to the driver's driving operation (an accelerator operation or an acceleration operation) that has been detected by an operation detection sensor (that is an accelerator opening sensor) 7a provided on an accelerator pedal 7A, and switches the gear ratio of the transmission, based on information such as a vehicle speed that has been detected by a vehicle speed sensor 7c. When the driving state of the vehicle 1 is automated driving, the ECU 26 automatically controls the power plant 6 in response to an instruction from the ECU 20, and controls the acceleration or deceleration of the vehicle 1. Note that acceleration in each direction and angular acceleration around an angular axis detected by the gyro sensor 5, the vehicle speed detected by the vehicle speed sensor 7c, and the like are information indicating the traveling state of the vehicle, and these sensors are also collectively referred to as a traveling state monitoring unit. Furthermore, an operation detection sensor 7a of the accelerator pedal 7A and an operation detection sensor (that is, a brake press force sensor) 7b of a brake pedal 7B to be described later may be included in the traveling state monitoring unit. However, in the present example, these sensors are referred to as an operation state detection unit together with a detection unit, not illustrated, that detects an operation state of another device.

The ECU 27 controls lighting devices (headlights, taillights, and the like) including direction indicators 8. In the example of FIG. 1, the direction indicators 8 are each provided at the front part, the door minor, and the rear part of the vehicle 1.

The ECU 28 controls an input and output device 9. The input and output device 9 outputs information to the driver, and receives an input of information from the driver. A sound output device 91 notifies the driver of information by sound. A display device 92 notifies the driver of information by displaying an image. The display device 92 is arranged on, for example, a front surface of a driver's seat, and constitutes an instrument panel or the like. Note that, although the sound and the image display have been given as examples here, information may also be notified by using vibration or light. An input device 93 is arranged at a position where the driver is able to operate, and constitutes a switch group for giving an instruction to the vehicle 1, but may also include a voice input device.

The ECU 29 controls a brake device 10 and a parking brake (not illustrated). The brake device 10 is, for example, a disc brake device, and is provided on each wheel of the vehicle 1 to decelerate or stop the vehicle 1 by applying resistance to the rotation of the wheel. The ECU 29, for example, controls working of the brake device 10 in response to a driver's driving operation (brake operation) that has been detected by the operation detection sensor 7b provided on the brake pedal 7B. When the driving state of the vehicle 1 is the automated driving, the ECU 29 automatically controls the brake device 10 in response to an instruction from the ECU 20, and controls the deceleration or stop of the vehicle 1. The brake device 10 and the parking brake are also capable of working so as to maintain a stopped state of the vehicle 1. In addition, in a case where the transmission of the power plant 6 includes a parking lock mechanism, such a parking lock mechanism can also be operated so as to maintain the stopped state of the vehicle 1.

Vehicle Control System

Figure 2:
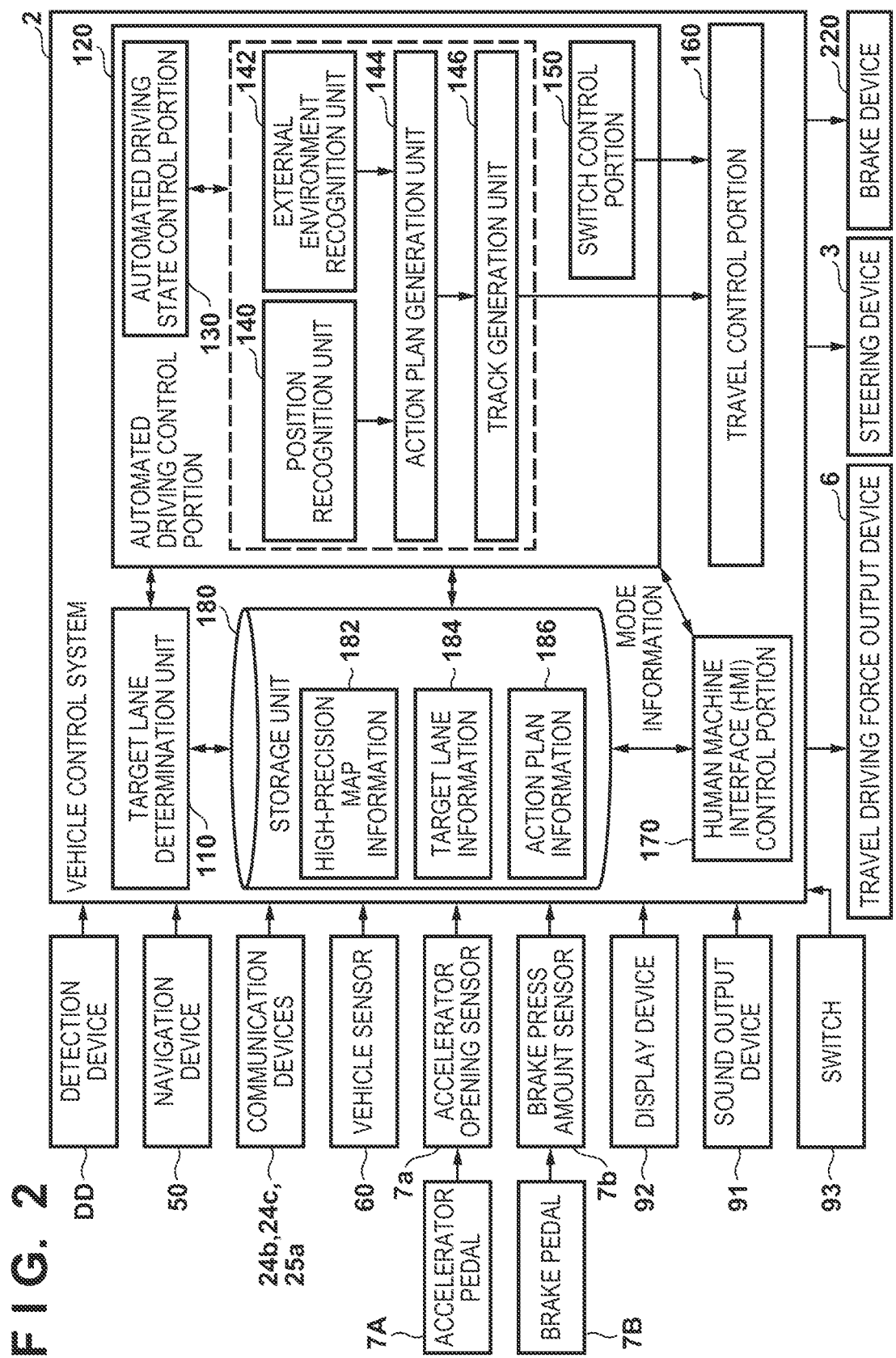
FIG. 2 is a functional block diagram of a vehicle control system (control unit)

FIG. 2 illustrates a functional configuration of the control unit 2 in the present embodiment. The control unit 2 is also referred to as a vehicle control system, and each ECU including the ECU 20 executes a program or the like to achieve each functional block illustrated in FIG. 2. In FIG. 2, the vehicle 1 includes a detection device DD including the camera 41, the LiDAR 42, the radar 43, and the like, a navigation device 50, the GPS sensor 24b, the communication devices 24c and 25a, and a vehicle sensor 60 including the gyro sensor 5, the steering wheel grip sensor, the driver state detection camera 41a, and the like. The vehicle 1 further includes the accelerator pedal 7A, the accelerator opening sensor 7a, the brake pedal 7B, the brake press amount sensor 7b, the display device 92, the sound output device 91 (for example, a speaker), and the switch 93 including an automated driving changeover switch. Furthermore, the vehicle 1 is equipped with a vehicle control system 2, the travel driving force output device 6, the steering device 3, and a brake device 220. These devices and pieces of equipment are connected with each other through a multiplex communication line such as a controller area network (CAN) communication line, a serial communication line, a wireless communication network, or the like.

The navigation device 50 includes a global navigation satellite system (GNSS) receiver, map information (navigation map), a touch panel type display device that functions as a user interface, a speaker, a microphone, and the like. The navigation device 50 specifies the position of the vehicle 1 (also referred to as a self-vehicle) using the GNSS receiver, and derives a route from the position to a destination that has been designated by the user. The route that has been derived by the navigation device 50 is provided for a target lane determination unit 110 of the vehicle control system 2. Note that the configuration for specifying the position of the vehicle 1 may be provided independently of the navigation device 50.

The GPS sensor 24b and the communication devices 24c and 25a conduct wireless communication using, for example, a cellular network, a Wi-Fi network, Bluetooth (registered trademark), dedicated short range communication (DSRC), or the like. Through these communication devices, the vehicle control system is capable of acquiring, for example, information about a traveling road on which the vehicle is currently traveling, for example, information about a speed limit (including an upper limit speed and acceleration or deceleration speeds).

The vehicle sensor 60 includes a vehicle speed sensor that detects a vehicle speed, an acceleration sensor that detects acceleration, a yaw rate sensor that detects an angular velocity around a vertical axis, an orientation sensor that detects an orientation of the vehicle 1, and the like. All or a part of these sensors are achieved by the gyro sensor 5. In addition, the steering wheel grip sensor, not illustrated, and the driver state detection camera 41a may be included in the vehicle sensor 60.

The accelerator pedal 7A is an operator for receiving an acceleration instruction by the driver (or a deceleration instruction by a return operation). The accelerator opening sensor 7a detects a press amount of the accelerator pedal 7A, and outputs an accelerator opening signal indicating the press amount to the vehicle control system 2. Note that instead of outputting to the vehicle control system 2, the output may be directly given to the travel driving force output device 6, the steering device 3, or the brake device 220. The same applies to configurations of other driving operation systems to be described below.

The brake pedal 7B is an operator for receiving a deceleration instruction by the driver. The brake press amount sensor 7b detects a press amount (or press force) of the brake pedal 7B, and outputs a brake signal indicating a detection result to the vehicle control system 2.

The display device 92 is, for example, a liquid crystal display (LCD), an organic electroluminescence (EL) display device, or the like to be attached to each part of the instrument panel, any place facing the passenger seat, the rear seat, or the like. In addition, the display device 92 may be a head up display (HUD) that projects an image on a front windshield or another window. The sound output device 91 is, for example, a speaker that outputs sound.

The travel driving force output device 6 outputs, to the driving wheels, travel driving force (torque) for the vehicle to travel. The travel driving force output device 6 includes, for example, the engine, the transmission, and an engine electronic control unit (ECU) that controls the engine. Note that the travel driving force output device 6 may be an electric motor or a hybrid engine in which an internal combustion engine and an electric motor are combined.

The brake device 220 is, for example, an electric servo brake device including a brake caliper, a cylinder that transmits hydraulic pressure to the brake caliper, an electric motor that generates the hydraulic pressure in the cylinder, and a braking control portion. The braking control portion of the electric servo brake device controls the electric motor in accordance with information input from a travel control portion 160, so that the braking torque corresponding to the braking operation is output to each wheel. In addition, the brake device 220 may include a regenerative brake by a traveling motor that can be included in the travel driving force output device 6.

In addition, the vehicle control system 2 includes, for example, the target lane determination unit 110, an automated driving control portion 120, the travel control portion 160, a human machine interface (HMI) control portion 170, and a storage unit 180. The automated driving control portion 120 includes, for example, an automated driving state control portion 130, a position recognition unit 140, an external environment recognition unit 142, an action plan generation unit 144, a track generation unit 146, and a switch control portion 150. Some or all of the target lane determination unit 110, the automated driving control portion 120, the travel control portion 160, and the HMI control portion 170 are achieved by a processor executing a program (software). Further, some or all of them may be achieved by hardware such as a large scale integration (LSI) or an application specific integrated circuit (ASIC), or may be achieved by a combination of software and hardware.

The storage unit 180 stores, for example, information such as high-precision map information 182 including information about the center of a lane, information about a boundary of a lane, and the like, target lane information 184, action plan information 186, and the like. The target lane determination unit 110 divides the route that has been provided from the navigation device 50 into a plurality of blocks (for example, divides the route for every 100 meters in the vehicle traveling direction), and determines a target lane for every block with reference to the high-precision map information 182. The target lane determination unit 110 determines, for example, which lane from the left to travel in. For example, in a case where a branching place, a merging place, or the like is present in the route, the target lane determination unit 110 determines the target lane so that the vehicle 1 can travel along a reasonable travel route for traveling to a branch destination. The target lane that has been determined by the target lane determination unit 110 is stored, as target lane information 184, in the storage unit 180. It is sufficient if the high-precision map information 182 is a map around the location where the vehicle is traveling, and it is sufficient if the communication device 24c or the like acquires map information of a new location in accordance with a movement of the vehicle. The map around the location while traveling is also referred to as a local map.

The automated driving state control portion 130 determines a control state (also referred to as an automated driving state) of the automated driving conducted by the automated driving control portion 120. As described in the beginning, the automated driving control state in the present embodiment includes the first and second control states. Note that the following description is merely an example, and the number of control states of the automated driving may be optionally determined.

The position recognition unit 140 of the automated driving control portion 120 recognizes the lane in which the vehicle 1 is traveling (traveling lane) and a relative position of the vehicle 1 with respect to the traveling lane, based on the high-precision map information 182 stored in the storage unit 180 and information input from the LiDAR 42, the radar 43, the camera 41, the navigation device 50, or the vehicle sensor 60. Specifically, the relative position with respect to the traveling lane is, for example, a position with the center in the width direction of the lane as a reference. As will be described with reference to FIGS. 3 to 5C, a first position (also referred to as a map matching position) is estimated, based on the global navigation satellite system (GNSS) signal such as GPS or the like, map information, and a camera image. On the other hand, a second position (also referred to as an odometry position or a dead reckoning position) obtained by adding a movement amount of the vehicle 1 that has been estimated from the signal of the vehicle speed or the like input from the vehicle sensor 60 to a position to be a reference, for example, a position that was determined most recently is estimated. These first and second positions are synthesized together through a complementary filter, and the position is determined.

The travel control portion 160 controls the travel driving force output device 6, the steering device 3, and the brake device 220 so that the vehicle 1 passes along the track that has been generated by the track generation unit 146 on time as scheduled. The HMI control portion 170 causes the display device 92 to display a video and an image, and causes the sound output device 91 to output sound. The travel control portion 160 determines, for example, a steering angle (system steering angle) for the automated driving in accordance with the action plan information 186, inputs the steering angle to the steering device 3, and causes the steering device 3 to conduct the steering control. Note that the fact that the lane in which the vehicle is traveling curves can be recognized by, for example, the high-precision map information 182 or the external environment recognition unit 142 to be described below.

The external environment recognition unit 142 recognizes a position of a target object such as a surrounding vehicle and states of the speed, the acceleration, and the like, based on the information input from the camera 41, the LiDAR 42, the radar 43, and the like. Further, the external environment recognition unit 142 may recognize the positions of a guardrail, a utility pole, a parked vehicle, a pedestrian, and other objects, in addition to the surrounding vehicles. Furthermore, in the present embodiment, a traffic sign on a roadside included in the captured image is recognized. The traffic sign that has been recognized is referred to for the automated driving control. In the present example, in particular, a speed sign of an electrical bulletin system is recognized, and the speed limit displayed thereon is specified. The action plan generation unit 144 creates an action plan so as not to exceed the speed limit, and the travel control portion 160 controls traveling in accordance with the action plan.

The action plan generation unit 144 sets a start point for automated driving and/or a destination of the automated driving. The start point for the automated driving may be the current position of the vehicle 1, or may be a location point where an operation for instructing the automated driving has been performed. The action plan generation unit 144 generates an action plan in a section between the start point and the destination of the automated driving. Note that the present invention is not limited to this, and the action plan generation unit 144 may generate an action plan for any section.

The action plan includes, for example, a plurality of events to be sequentially carried out. Examples of the event include a deceleration event for decelerating the vehicle 1, an acceleration event for accelerating the vehicle 1, a lane keep event for causing the vehicle 1 to travel so as not to deviate from a traveling lane, a lane change event for causing the vehicle 1 to change the traveling lane, an overtaking event for causing the vehicle 1 to overtake a preceding vehicle, a branch event for causing the vehicle 1 to change to a desired lane at a branch point or causing the vehicle 1 to travel so as not to deviate from a current traveling lane, a merging event for accelerating or decelerating the vehicle 1 in a merging lane for merging into a main line to change the traveling lane, and a handover event for causing the vehicle 1 to transition from an automated driving control state to a manual driving control state at a scheduled end point of the automated driving. The action plan generation unit 144 sets the lane change event, the branch event, or the merging event at a place where the target lane that has been determined by the target lane determination unit 110 is switched. Information indicating the action plan that has been generated by the action plan generation unit 144 is stored, as action plan information 186, in the storage unit 180.

Configuration of Position Recognition Unit

Figure 3:
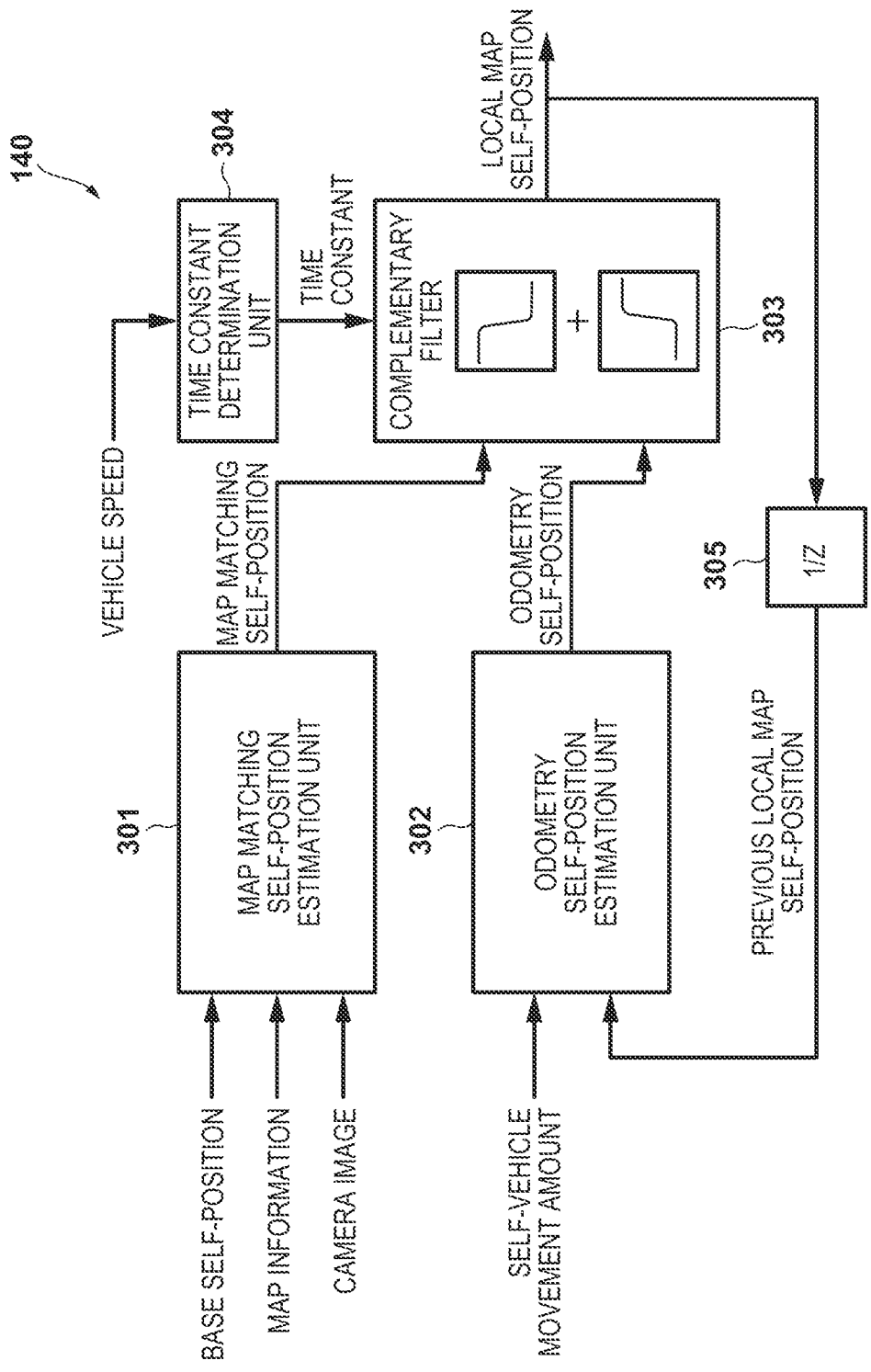
FIG. 3 is a block diagram illustrating a configuration of a position recognition unit.

FIG. 3 is a block diagram of the position recognition unit 140. A map matching position estimation unit 301 estimates a first position (map matching position), based on a base position that has been specified from the GNSS signal, detailed map information, and the camera image that has been captured by the camera 41. The base position includes an error, and the map matching position estimation unit 301, for example, collates the map information of the position specified by the base position information with the camera image so as to correct the error. The division line of the lane in which the vehicle is traveling may be recognized from the camera image, and the position in the width direction of the road may be estimated, based on the position of the division line that has been recognized.

An odometry position estimation unit 302 estimates a second position (odometry position) using a position that has been determined at a previous time (previous local map position) and a movement amount of the vehicle 1, as inputs. The movement amount of the vehicle 1 may be specified, for example, by integrating a speed vector specified by the vehicle speed that has been detected by the vehicle speed sensor 7c and a traveling direction that has been detected by an orientation sensor or a steering angle sensor, from the time when the position was determined at the previous time to the present time. The odometry position is estimated by adding such a movement amount of the vehicle to the previous local map position that is a reference position.

A complementary filter 303 uses the map matching position as an input into a low-pass filter and the odometry position as an input into a high-pass filter, and outputs a new local map position obtained by synthesizing those positions. At the time of synthesis, the frequency band in which the two filters overlap with each other may be multiplied by a predetermined coefficient so as to be adjusted to have a uniform gain for the entire frequency band as a complementary filter. That is, the complementary filter 303 functions as a position determination unit. Furthermore, the complementary filter 303 is configured to be capable of setting a time constant. The local map position that has been determined is held in a latch 305 until a further new local map position is output. The local map position that has been held is fed back to the odometry position estimation unit 302, and is used as a reference position for the next position determination.

A time constant determination unit 304 uses the vehicle speed as a parameter to determine the time constant of the complementary filter 303, and sets the time constant in the complementary filter 303. Note that the position includes, for example, a longitude, a latitude, and a direction (azimuth angle) of the vehicle. Therefore, each of the longitude, the latitude, and the azimuth angle is filtered. Complementary filters having the same characteristics may be used for the longitude and the latitude, and a complementary filter having a characteristic different from those may be used for the azimuth angle.

Vehicle Speed and Time Constant

Figure 4A:
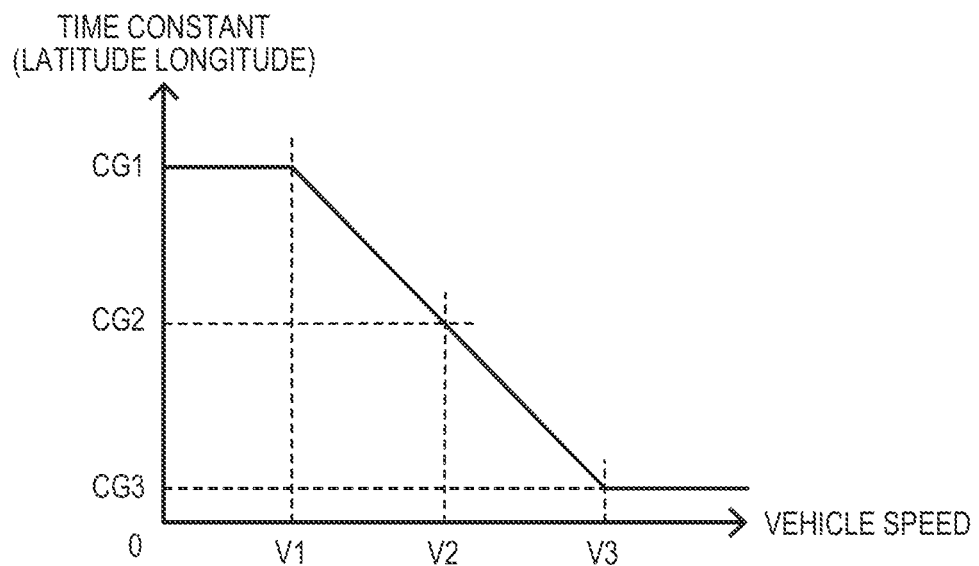
FIGS. 4A and 4B are diagrams each illustrating an example of a relationship between a time constant of a complementary filter included in the position recognition unit and a speed.
Figure 4B:
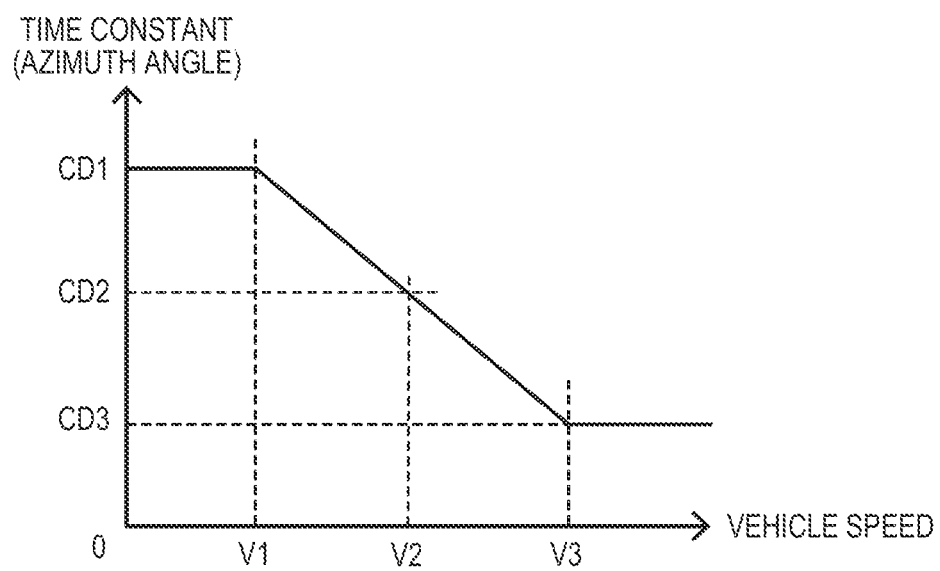

FIGS. 4A and 4B each illustrate an example of a relationship between the vehicle speed and the time constant to be output by the time constant determination unit 304. FIG. 4A illustrates a time constant of a complementary filter of the longitude and the latitude, and FIG. 4B illustrates a time constant of a complementary filter of the azimuth angle. In this manner, different time constants can be respectively set for the longitude and the latitude, and the azimuth angle. For example, in FIG. 4A, when the vehicle speed is equal to or lower than a first threshold value V1, the time constant determination unit 304 outputs a first value CG1, which is a maximum value as the time constant. Time constants CG2 and CG3, which linearly decrease in accordance with the vehicle speed, are output before the vehicle speed reaches a second threshold value V3 after exceeding V2. The second value CG3, which is the minimum value, is output at a vehicle speed exceeding the second threshold value V3. The same applies to the azimuth angle in FIG. 4B, but the azimuth angle is different from that in FIG. 4A in that the maximum value is CD1 and the minimum value is CD3. Note that the vehicle speed threshold values V1 and V3 are set to be the same in FIGS. 4A and 4B, but may be different values.

Figure 5A:
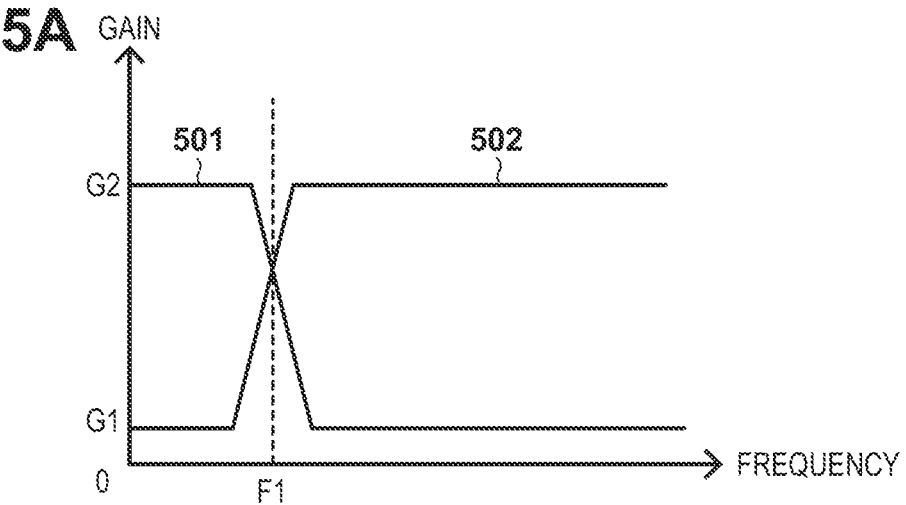
FIGS. 5A to 5C are diagrams each illustrating an examples of a change in characteristic due to the time constant of the complementary filter included in the position recognition unit.
Figure 5B:
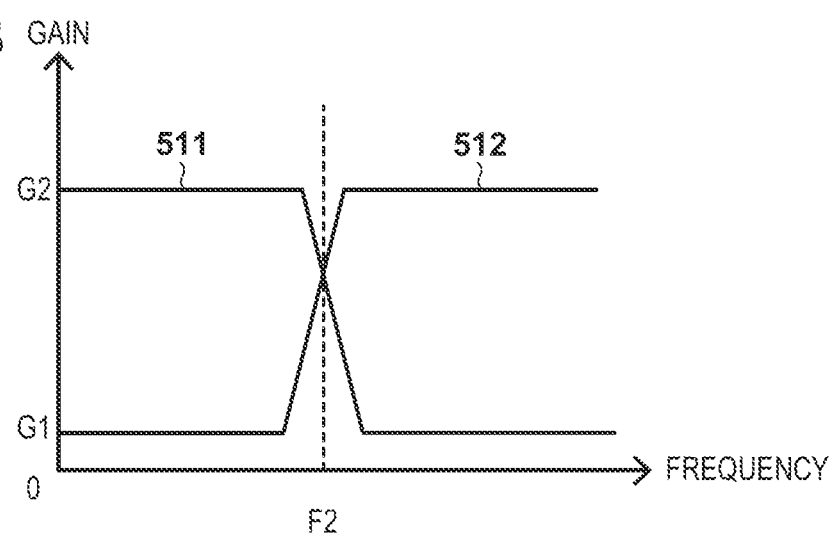
Figure 5C:
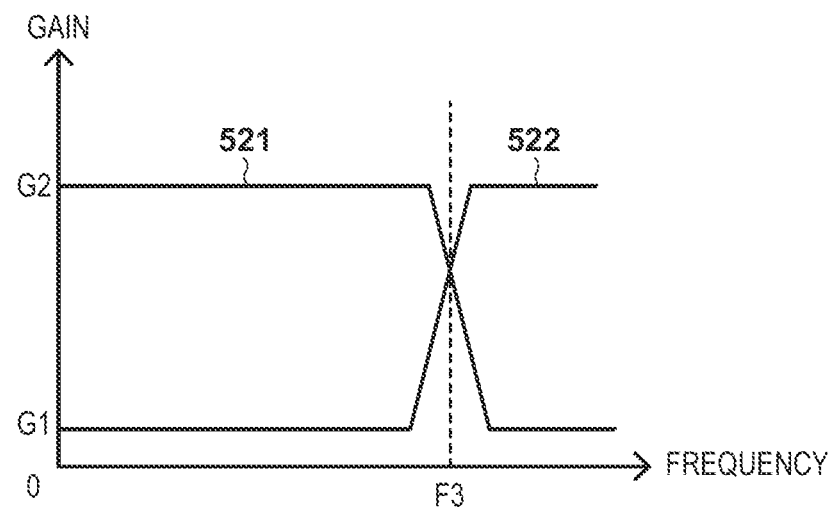

FIGS. 5A to 5C each illustrate an example of a characteristic diagram of the complementary filter 303. FIGS. 5A to 5C each illustrate general characteristics of the complementary filter for the longitude and the latitude, and the azimuth angle included in the complementary filter 303. These filters are common in characteristic, although specific numerical values and the like are different from one another. Regarding the vehicle speeds V1 and V3 each serving as a threshold value, V1 may be a value of, for example, 0.5 km/h, and V3 may be a value of, for example, 2 km/h. It is desirable that V1 is a value larger than 0.

Characteristics of Complementary Filter

FIG. 5A illustrates characteristics of the complementary filter 303 when the vehicle speed is equal to or lower than V1, that is, the vehicle speed is equal to or lower than a predetermined speed and the time constant is CG1 or CD1. A cutoff frequency F1 in such a case is a frequency corresponding to the maximum value CG1 or CD1 of the time constant. In this case, the cutoff frequency is the lowest in both a characteristic 501 of the low-pass filter and a characteristic 502 of the high-pass filter, and the output from the complementary filter 303 is a component in which the high-pass filter side, that is, the odometry position is dominant up to a low-frequency region. That is, the position weighted by the odometry position is output as the local map position. The characteristic may be given such that the map matching position is blocked over the entire frequency component, and the odometry position itself is output as the local map position.

FIG. 5C illustrates characteristics of the complementary filter 303, in a case where the vehicle speed is higher than V3, that is, the time constant is CG3 or CD3. In this case, a cutoff frequency F3 is a frequency corresponding to the minimum value CG3 or CD3 of the time constant. In this case, the cutoff frequency is the highest in both a characteristic 521 of the low-pass filter and a characteristic 522 of the high-pass filter, and the output from the complementary filter 303 is a component in which the low-pass filter side, that is, the map matching position is dominant up to a high-frequency region. That is, the position weighted by the map matching position is output as the local map position. The characteristic may be given such that the odometry position is blocked over the entire frequency component, and the map matching position itself is output as the local map position.

FIG. 5B illustrates characteristics of the complementary filter 303 in a case where the vehicle speed is V2, which is an intermediate value between V1 and V3. A cutoff frequency F2 is an intermediate value between the frequencies F1 and F3. In an intermediate region, the cutoff frequency of the complementary filter 303 increases in a continuous or stepwise manner, as the vehicle speed increases and the time constant decreases. Accordingly, the local map position output from the complementary filter 303 becomes a component in which the map matching position is more dominant.

Such a change in the characteristic of the complementary filter 303 corresponding to the setting of the time constant is achievable, for example, as follows. In a case of a digital filter, values of the longitude, the latitude, and the azimuth angle to be input in time series for a predetermined period of time are stored, and the values are converted into a frequency region by discrete cosine transformation or the like. The converted values are weighted for each frequency component using a filter matrix, and are inversely converted into an original spatial region. Here, filter matrices respectively having the characteristics as illustrated in FIGS. 5A to 5C are prepared beforehand in association with the time constants, and a filter process is performed using the filter matrix associated with the time constant that has been input. The number of the filter matrices that can be prepared is finite. Hence, a filter matrix associated with a time constant approximate to the time constant that has been input may be used. Alternatively, a filter matrix associated with two time constants that have been prepared beforehand and that are larger and smaller than the time constant that has been input may be selected, and a filter matrix that has been generated by linearly interpolating those filter matrices may be used.

Alternatively, the values of the longitude, the latitude, and the azimuth angle to be input may be converted into analog values, and the filter process may be performed using a complementary filter of an analog configuration. Also in such a case, a complementary filter having a characteristic corresponding to the time constant may be prepared beforehand, and the filter process may be performed by switching in accordance with the time constant.

In any case, a filter having a characteristic corresponding to the time constant is prepared beforehand, and the filter to be used is switched in accordance with the time constant, so that a complementary filter having a characteristic corresponding to the vehicle speed can be used.

Example of Control

FIG. 6 illustrates an example of the position determination of the vehicle illustrated in FIGS. 3 to 5C. The bottom row indicates a temporal change in the vehicle speed. The middle row indicates a change in the time constant of the complementary filter 303 in accordance with the vehicle speed. This time constant is indicated using one filter as an example. The top row illustrates an example of a local map position obtained by passing through the adaptive complementary filter 303 for setting the time constant in accordance with the vehicle speed, and a local map position obtained by passing through a complementary filter in which the time constant is fixed to a value corresponding to the second threshold value V3 of the vehicle speed, for example, CG1 or CD1. The value obtained by using the adaptive complementary filter 303 is indicated by a circle, and the value obtained by using the fixed complementary filter is indicated by a dot and a line. Note that the local map position is indicated by a relative position with respect to the center line of the traveling lane in the width direction.

When the vehicle speed exceeds the second threshold value V3, the time constant is constant, for example, CG3. In this case, the local map position obtained by using any of the complementary filters indicates the same position. When the vehicle speed becomes equal to or lower than the second threshold value V3, that is, an extremely low speed, the time constant is increased in accordance with the speed, and becomes a maximum value at the vehicle speed V1. In this situation, the characteristic of the adaptive complementary filter 303 changes, and the high-pass filter side, that is, the odometry position becomes dominant up to a low-frequency component. As a result, in the output from the complementary filter 303, a variation in the position caused by erroneous recognition of the division line or the like from the camera image is suppressed, and the position while the vehicle stops also stably indicates the same position.

On the other hand, in the output from the complementary filter having a fixed time constant, the variation in position due to erroneous recognition or the like of the division line from the camera image is reflected without change, and the position of the vehicle is not stabilized even while the vehicle stops, and values that vary over time are output. When the vehicle starts traveling and the vehicle speed exceeds the second threshold value V3, the characteristics of both complementary filters agree with each other again, and stably indicate the same position.

As described heretofore, according to the present embodiment, the map matching position and the odometry position are synthesized using the complementary filter that changes the characteristic in accordance with the traveling speed of the vehicle. In particular, the map matching position is used as an input into the low-pass filter, the odometry position is used as an input into the high-pass filter, and the cutoff frequency is set to be higher, as the vehicle speed decreases. Accordingly, in the low-speed range, it is possible to obtain a position having the odometry position as a main component, and to stabilize the position with high accuracy. Therefore, it is possible to prevent an intervention of the automated driving due to an error in the determined position, for example, the transition in the automated driving level.

Another Embodiment

In the above embodiment, a configuration may be made such that the map matching position and the odometry position are synthesized using the complementary filter, but either one of the positions is selectively output using a switch. For example, a configuration may be made such that the map matching position is output as a local map position at a vehicle speed exceeding the first threshold value V1 illustrated in FIGS. 4A and 4B, and the odometry position is output as the local map position at a vehicle speed equal to or lower than the first threshold value V1. In such a configuration, in addition to the effects of the above-described embodiment, a simpler configuration is enabled, and responsiveness is also improvable.

Summary of Embodiments

The above-described embodiments are summarized as follows.

(1) According to a first aspect of the present invention, there is provided a position determination device including:
an imaging unit configured to capture an image ahead of a vehicle;
a position information acquisition unit configured to acquire position information of the vehicle;
a first position estimation unit configured to estimate a first position of the vehicle, based on a position of a lane included in the image, the position information of the vehicle that has been acquired, and map information;
a second position estimation unit configured to estimate a second position of the vehicle, based on a position of the vehicle that was determined most recently and a movement amount of the vehicle; and
a position determination unit configured to synthesize the first position and the second position to determine the position of the vehicle, in which
the position determination unit weights the second position while the vehicle is traveling at a speed equal to or lower than a predetermined speed, and synthesizes the first position and the second position.

Accordingly, it is possible to determine the position with high accuracy even in the low-speed range.

(2) According to a second aspect of the present invention, in the position determination device of (1), the position determination unit increases weighting of the second position, as the speed of the vehicle decreases.

Accordingly, it is possible to weight the second position based on the movement amount of the vehicle as the speed decreases, and to prevent an influence of an error in the first position.

(3) According to a third aspect of the present invention, in the position determination device of (1) or (2), the position determination unit determines the position from information about only the second position before the vehicle stops.

Accordingly, particularly at an extremely low speed before the vehicle stops, it is possible to position using only the second position based on the movement amount of the vehicle, and to eliminate an influence of an error in the first position.

(4) According to a fourth aspect of the present invention, in the position determination device of one of (1) to (3), the position determination unit includes a complementary filter configured to filter the first position with a low-pass filter and the second position with a high-pass filter, and configured to synthesize the first position and the second position.

Accordingly, it is possible to weight the first position and the second position in accordance with a frequency component.

(5) According to a fifth aspect of the present invention, in the position determination device of (4), the position determination unit changes a time constant of the complementary filter in accordance with the speed of the vehicle to weight the second position.

Accordingly, the use of the complementary filter in which the time constant is changed in accordance with the speed enables weighting of the first position and the second position, while continuously changing the filter characteristic.

The invention is not limited to the foregoing embodiments, and various variations/changes are possible within the spirit of the invention.

What is claimed is:

1. A position determination device comprising:
    a camera configured to capture an image ahead of a vehicle;
    at least one memory;
    at least one processor, at least one program stored in the at least one memory, when executed, causing the at least one processor to function as:
    a position information acquisition unit configured to acquire position information of the vehicle;
    a first position estimation unit configured to estimate a first position of the vehicle, based on a position of a lane included in the image, the position information of the vehicle that has been acquired, and map information;
    a second position estimation unit configured to estimate a second position of the vehicle, based on a position of the vehicle that was determined most recently and a movement amount of the vehicle; and
    a position determination unit configured to synthesize the first position and the second position to determine the position of the vehicle, wherein
    the position determination unit weights the second position while the vehicle is traveling at a speed equal to or lower than a predetermined speed, and synthesizes the first position and the second position, wherein
    the position determination unit includes a complementary filter configured to filter the first position with a low-pass filter and the second position with a high-pass filter, and configured to synthesize the first position and the second position.

2. The position determination device according to claim 1, wherein
    the position determination unit increases weighting of the second position, as the speed of the vehicle decreases.

3. The position determination device according to claim 1, wherein
    the position determination unit determines the position from information about only the second position before the vehicle stops.

4. The position determination device according to claim 1, wherein
    the position determination unit changes a time constant of the complementary filter in accordance with the speed of the vehicle to weight the second position.

5. A vehicle comprising a position determination device, the position determination device comprising:
    a camera configured to capture an image ahead of the vehicle;
    at least one memory;
    at least one processor, at least one program stored in the at least one memory, when executed, causing the at least one processor to function as:
    a position information acquisition unit configured to acquire position information of the vehicle;
    a first position estimation unit configured to estimate a first position of the vehicle, based on a position of a lane included in the image, the position information of the vehicle that has been acquired, and map information;
    a second position estimation unit configured to estimate a second position of the vehicle, based on a position of the vehicle that was determined most recently and a movement amount of the vehicle; and
    a position determination unit configured to synthesize the first position and the second position to determine the position of the vehicle, wherein
    the position determination unit weights the second position while the vehicle is traveling at a speed equal to or lower than a predetermined speed, and synthesizes the first position and the second position, wherein
    the position determination unit includes a complementary filter configured to filter the first position with a low-pass filter and the second position with a high-pass filter, and configured to synthesize the first position and the second position.

6. The vehicle according to claim 5, wherein
    the position determination unit increases weighting of the second position, as the speed of the vehicle decreases.

7. The vehicle according to claim 5, wherein
    the position determination unit determines the position from information about only the second position before the vehicle stops.

8. The vehicle according to claim 5, wherein
    the position determination unit changes a time constant of the complementary filter in accordance with the speed of the vehicle to weight the second position.

* * * * *